United States Patent Office 2,742,184
Patented Apr. 17, 1956

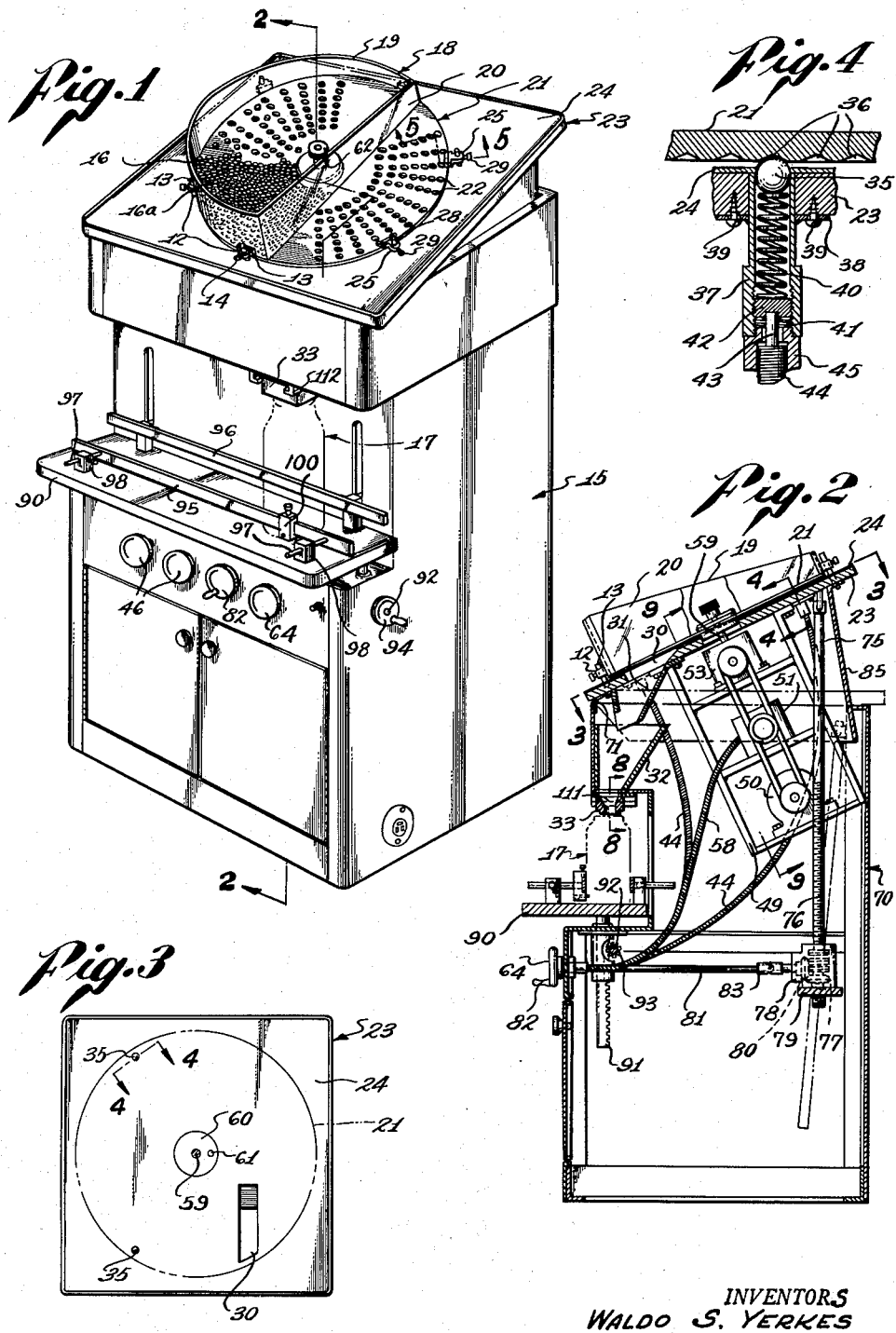
April 17, 1956 — W. S. YERKES ET AL — 2,742,184
DISPENSING DEVICE FOR A COUNTING AND PACKING MACHINE
Filed Dec. 26, 1950 — 2 Sheets-Sheet 1
INVENTORS
WALDO S. YERKES
PAUL R. CHAMBERLAIN
THEODORE G. BELL
ROBERT C. WEATHERWAX
BY Fulwider & Mattingly
ATTORNEYS

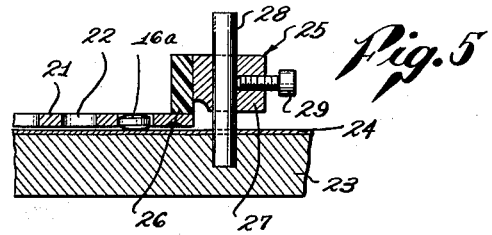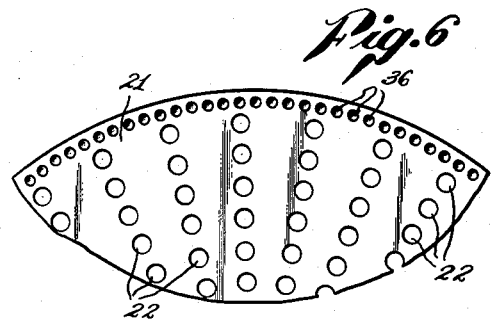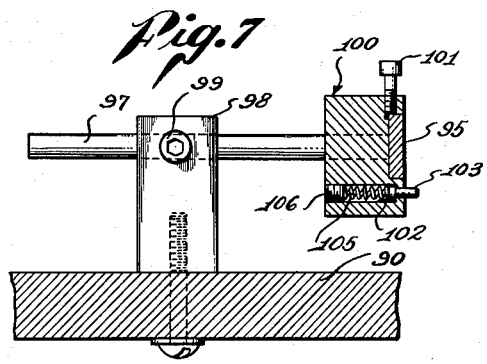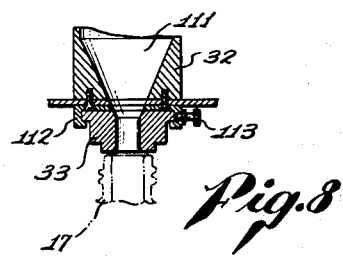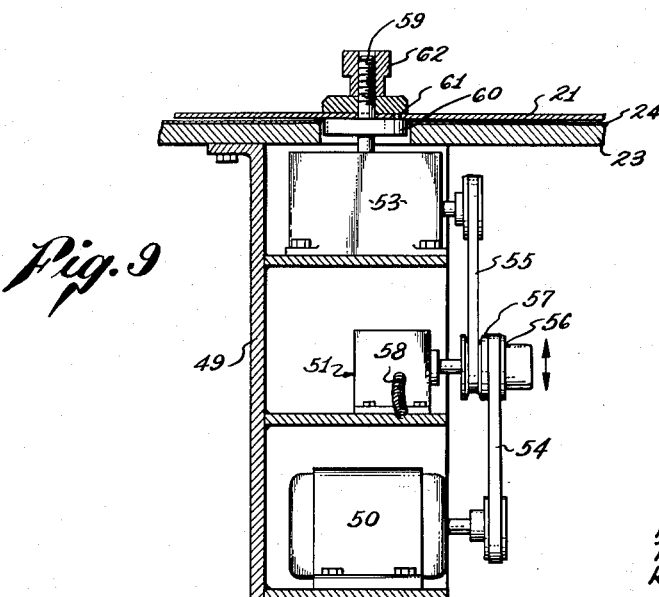

2,742,184

DISPENSING DEVICE FOR A COUNTING AND PACKING MACHINE

Waldo S. Yerkes, Van Nuys, Paul R. Chamberlain, Los Angeles, Theodore G. Bell, Van Nuys, and Robert C. Weatherwax, Burbank, Calif., assignors, by direct and mesne assignments, to Fairchild's, Incorporated, Glendale, Calif., a corporation of California Application December 26, 1950, Serial No. 202,792

9 Claims. (Cl. 221—203)

This invention relates generally to the counting and packing of small objects, such as medicine capsules, tablets or pills, hard candies, and the like, and more particularly, to a machine of this type which is adapted to count from a bulk supply predetermined numbers of objects and deliver the same into a jar, bottle, or other receptacle.

In general, machines of this type have, in the past, included a relatively large bulk supply adjacent which is a movable flat plate having formed therein a number of apertures, each of a size to just receive one of the objects to be counted. The aforesaid plate is, in turn, next to a second surface which prevents the object from passing entirely through the aperture plate. In order then to count out a predetermined number of objects, the aperture plate is moved from the bulk supply, carrying with it such of the objects as are in the apertures. Such movement of the plate is continued to carry the objects to a point where a larger aperture is formed in the second surface, thus permitting the objects carried by the aperture plate to pass into a box, jar, or other receptacle.

Machines of the type just described have had, in the past, various disadvantages, among them being the fact that continued agitation of the bulk supply is required in order to induce the capsules or other objects to move into the holes in the aperture plate. Furthermore, such agitation, if severe, tends to damage such articles as uncoated aspirin tablets and the like, producing a good deal of powder and small chips which greatly interfere with the successful operation of the device.

Still further, it has been conventional practice to slide the aperture plate past a cleaning edge, sometimes provided with a brush, in order that the aperture plate will carry with it only such objects as have moved into the apertures. If, in such operation, the bulk supply piles up adjacent the cleaning edge just described, further damage to the objects being counted is occasioned by their tumbling action adjacent the cleaning edge.

While it is sometimes possible to place the aperture plate and the adjacent surface at such an angle to the horizontal that some of the foregoing disadvantages are cured, such construction is usually adapted for one type of capsule or product only, for example uncoated tablets, and is of particular disadvantage if some other type of capsule is to be counted, for example slick, smooth coated tablets, or as another example, gelatin capsules.

Bearing in mind the disadvantages just stated, it is a major object of the present invention to provide a capsule-counting and packing machine which is adaptable for a wide variety of different types of objects, and which may be adjusted to provide optimum operation for each type of article to be packed.

It is another object of the present invention to provide a machine of the class described which is adapted to discharge the counted articles into receptacles of various sizes and shapes.

It is still another object of the invention to provide in a machine of the class described, receptacle-guiding means which is adjustable for various types of receptacles, and which quickly and accurately positions the same to receive the articles being counted and packed.

Yet a further object of the invention is to provide a machine of the class described which causes a minimum of roiling movement of the articles being packed whereby to obviate, to a large extent, damage to the articles during packing.

It is a still further object of the invention to provide a machine of the class described which eliminates the necessity of brushes, felt wipers, and other elements contacting the product being packed, whereby to avoid the possibility of contaminating the material being counted and packed.

The foregoing and additional objects and advantages of the invention will be apparent from the following detailed description of one embodiment thereof, consideration being given likewise to the attached drawings in which:

Figure 1 is a perspective view of a capsule-counting and packing machine embodying the invention;

Figure 2 is an elevational section taken on the line 2—2 in Figure 1;

Figure 3 is an oblique plan view taken in a plane parallel to the top surface of the device shown in Figure 1, and with the apertured disc removed to show the underlying construction;

Figure 4 is an elevational section taken on the line 4—4 in Figures 2 and 3;

Figure 5 is an elevational section taken on the line 5—5 in Figure 1;

Figure 6 is a fragmentary view of the underside of the aperture disc of the device shown in Figure 1;

Figure 7 is an enlarged fragmentary section taken in the plane of Figure 2 and partially sectioned to illustrate a portion of the receptacle-guiding means therein;

Figure 8 is an enlarged elevational section taken on the line 8—8 in Figure 2; and Figure 9 is an oblique sectional view taken on the line 9—9 in Figure 2.

In the drawings the reference character 15 indicates a machine embodying the present invention ; 16 identifies a bulk supply of tablets 16a; and 17 identifies a receptacle into which they are to be delivered (shown in phantom line in Figure 1). The bulk supply 16 is supported in a hopper 18 having a partially circular upstanding wall 19, a straight upstanding wall 20, and an open bottom. Inasmuch as the hopper 18 is forwardly sloping, as shown in Figure 1, the same is made with walls of tapering width, being deeper at the forward end than at the rearward end thereof, as shown in the drawings.

Immediately underlying the hopper 18 and in sliding contact with the lower edges of the walls 19 and 20 so as to form a bottom for the hopper, is a rotatable disc 21 having a plurality of patterns of uniformly arranged apertures 22 therein. Immediately underlying the disc 21 and in closely spaced parallel relationship therewith is a tiltable table 23 having a smooth, substantially friction-free top surface 24 of stainless steel, formica, or other material which is corrosion resistant, adapted to take a high polish, and is easily cleaned. The hopper 18 is supported from the table 23 by a number of brackets 12 secured to the hopper wall 19 adjacent the lower edge thereof and each bored to receive one of a number of upstanding posts 13 fixed in the table 23. The brackets 12 are removably and adjustably secured to the posts 13 by set screws 14.

As can be seen best in Figure 5, the relationship of the table 23 and the disc 21, and the thickness of the latter, is such that a tablet 16a forming one of the units of the bulk supply 16 just fits into one of the apertures 22. As the disc 21 rotates, the tablet 16a in each of the apertures 22 slides along the smooth table surface 24. The spacing of the disc 21 and the table top 24 is accurately maintained by the sliding contact of the lower edges of the hopper walls 19 and 20 with the disc, and also by hold-down guides 25, each comprising a bearing shoe 26 secured to a body 27, the latter being vertically adjustable and carried on a post 28 to which it may be adjustably secured by a set screw 29. The posts 28 are fixed in the table 23 adjacent the edge of the disc 21, as can be seen best in Figure 1.

Thus, it will be seen that as the disc 21 rotates in a clockwise direction, the patterns of apertures 22 are caused to successively pass under the bulk supply 16. Each time the pattern of apertures passes under the bulk supply, as just described, each aperture is filled with a single tablet 16a, and a single "load" of tablets corresponding in number to the number of apertures 22 in each pattern, is carried out of the hopper 18, passing under the straight edge thereof adjacent the upper end of the hopper.

As each load of tablets is carried on around the path of the disc 21, the pattern of apertures 22 reaches a large unloading opening 30, formed in the table 23, and so positioned therein that each aperture in each pattern passes over the unloading aperture 30. Thus the tablets 16a are permitted to drop out of the apertures 22 in the plate 21, and fall into a receiving chute 31 secured to the undersurface of the table 23. From the receiving chute 31, the load of tablets is discharged into a fixed collecting chute 32, from whence they are discharged through a neck adapter 33 into the receptacle 17 positioned thereunder.

As earlier stated, it is undesirable to severely agitate the bulk supply 16 during the loading operations. It is, however, necessary to introduce a minimum amount of vibration during the loading operation in order to assure that each of the apertures 22 will be filled each time the pattern of apertures passes under the bulk supply 16. This problem has been solved in the present arrangement by vibrating the disc 21 rather than agitating the bulk supply of tablets 16. Such agitation is effected by causing the disc 21 to rotate progressively but with a semi-intermittent or fluctuating movement rather than rotating steadily. This fluctuating rotation of the disc 21 has been found to be extremely effective in causing the tablets 16a, or other objects to be packed, to settle into the apertures 22. Such vibration or intermittent movement does not, however, severely agitate the bulk supply 16, and thus does not damage the tablets 16a, as has been the case in previous machines of this type.

The means for accomplishing the aforesaid vibratory progressive rotation of the disc 21 is illustrated in Figures 3, 4, and 6. Here it will be seen that a spring-pressed detent ball 35 is urged upwardly into frictional contact with detents or sockets 36 in the undersurface of the disc 21, the sockets being formed in a circumferential row, positioned to be engaged by the ball 35 as the disc is rotated. The ball 35 is supported in a vertical tubular barrel 37, being relatively loose therein for free longitudinal movement, and being prevented from escaping from the upper end of the barrel 37 by the fact that an aligned aperture in the table top 24 is slightly smaller in diameter than the ball 35.

The barrel 37 has a mounting flange 38 secured thereto intermediate its ends as by brazing, welding, or similar means, and a flange 38 is secured to the undersurface of the table 23 by screws 39. A compression spring 40 is positioned under the ball 35 to urge the same upwardly, and the force exerted by the spring 40 is adjustable by means of an anchor plug 42 engaged with internal threads 41 formed in the barrel 37. A flexible control rod 43 of the type generally known as a Bowden cable is swedged, brazed, or otherwise secured into the plug 42, whereby the latter may be rotated from a remote point. The rod 43 is enclosed in conventional manner by a flexible sheath 44 having a terminal fitting 45 affixed thereto and threadedly engaged with the internal threads 41.

As can be seen best in Figures 2 and 3, a pair of the assemblies illustrated in Figure 4 are employed and engaged with the disc 21 at spaced points in the periphery thereof. The lower ends of the rods 43 and the sheath 44 surrounding the same are brought forwardly to the front of the base structure or cabinet 70, and have control knobs 46 affixed thereto whereby the compressive force exerted by the ball 35 against the disc 21 may be adjusted from the front of the machine 15.

Thus it will be seen that, as the disc 21 is rotated, its motion is resisted by the spring engagement of the ball 35 with the successive detents 36. Inasmuch as there is a slight yield in the mechanical drive of the disc, hereinafter to be described, the latter pauses slightly in its rotation each time the relative positions of a detent 36 and ball 35 is such as to force the ball downwardly. Conversely, when the ball is rolling into one of the detents 36, there is a tendency to force the disc ahead somewhat. This alternate pausing and acceleration causes a vibratory progressive rotation of the disc 21 which is particularly effective in causing the tablets 16a to settle into the apertures 22. It will be seen, however, that such agitation does not cause a severe roiling action of the bulk supply 16, such as would cause damage to the tablets 16a.

The power mechanism for driving the disc 21 is mounted in a dependent frame 49 secured to the undersurface of the table 23. Power is supplied from an electric motor 50 mounted adjacent the lower end of the frame 49, and is delivered through a speed change transmission 51 and a secondary transmission 53 to a vertical spindle 59 having an integral flange 60 to receive the disc 21 resting thereon. A fixed pin 61, positioned adjacent the periphery of the flange 60, enters an appropriately positioned aperture in the disc 21, whereby to positively drive the same as the spindle 59 is rotated. The upper end of the spindle 59 is threaded, as indicated, to receive a securing nut 62 which bears down on the upper surface of the disc 21 to secure the same against the flange 60.

The motor 50 rotates at a relatively uniform rate, but the speed of rotation of the disc 21 is varied by means of the transmission 51 which has on the extending shaft thereof a pair of complementally variable speed pulleys 56 and 57, engaged by V-belts 54 and 55, respectively, the former being driven by the motor 50 and the latter driving the secondary transmission 53. Complemental variation in the drive diameters of the V-pulleys 56 and 57 is accomplished in a well-known manner by means of a Bowden cable control assembly 58, the lower end of which is brought out forwardly in the manner of the previously described controls, and has an adjustment knob 64 thereon whereby the speed of powered rotation of the disc 21 may be adjusted from the front of the machine.

The speed to which the disc 21 is adjusted will depend on a number of factors, among which are the properties of the material 16 being packed, the number of patterns of apertures 22 around the disc, the facility with which the operator can remove and replace receptacles 17 in a manner hereinafter to be described, and so forth. Suffice it to say that the range of adjustment provided by the transmission 51 is sufficient to encompass wide variations in any or all of the factors above mentioned.

The table top 23 is hingedly secured to the cabinet 70 forming the lower stationary base of the device, by means of a transverse hinge 71 adjacent the forward edge of the table 23. Thus, the table 23 is supported for tilting movement from a substantially horizontal position indicated in phantom line in Figure 2 to a tilted position shown in full line therein. The tilting motion just described carries the power assembly frame 49 upwardly and downwardly with the table 23, and the motion is permitted by the flexibility of the cables 44 and 58.

The tilting movement of the table 23 is accomplished by means of a vertical thrust rod 75, articulately but non-rotatably secured to the table 23 adjacent its upper ends, and threaded along a lower portion 76, which threaded portion is received in an internally threaded bevel gear 77, rotatably mounted in a housing 78, the latter being carried on a pivotal shelf 79 which extends across the interior of the cabinet 70 adjacent the rearward vertical wall thereof. Thus, it will be seen that rotation of the bevel gear 77 about the non-rotating thrust rod 75 causes the same to move upwardly or downwardly, depending on the direction of rotation of the gear 77. The threaded bevel gear 77 is driven by a bevel drive gear 80 rotating on a horizontal shaft 81 which projects forwardly from the front of the cabinet 70, and has a hand wheel 82 secured to the forward end thereof for manual operation of the tilting assembly. In order to permit the tilting action of the shelf 79, which is necessary to permit the slight changes in disposition of the thrust rod 75 as the table 23 is moved upwardly or downwardly, a universal coupling 83 is interposed in the shaft 81.

Thus it will be seen that the table 23 may be raised or lowered to change the angular disposition thereof at any time, regardless of whether the disc is rotating or not, and without interference with the adjustability or then adjustment of the detent mechanisms shown in Figure 4.

A dependent apron 85, secured to the undersurface of the table 23, completes the substantial enclosure of the cabinet 70, regardless of the adjusted position of the tilted table 23. It will also be seen that the two delivery chutes 31 and 32 are arranged to telescope one within the other as the table 23 is lowered.

As has been previously stated, it is desirable to provide adjustment to receive receptacles of varying sizes and shapes. To this end, an adjustable shelf 90 is mounted across the front of the cabinet 70, being supported on a pair of vertical racks 91 for vertical adjustment to adapt the same to receive receptacles of varying heights. Vertical adjustment of the shelf 90 is accomplished by means of a transverse shaft 92 having a pair of pinions 93 secured thereon and meshed with the racks 91. The shaft 92 projects from the right-hand side of the cabinet 70 and has an adjusting hand wheel 94 secured thereto. Suitable means for locking the shaft 92 against rotation whereby to hold the shelf 90 in any adjusted position thereof are also provided, and such locking means being conventional in the art, there is no necessity for detailed description herein.

As the disc 21 is rotated to deliver loads or batches of the tablets 16a through the delivery chutes 31—32, receptacles are moved from left to right along the shelf 90, one being placed under the mouth of the fixed delivery chute 32 each time a load of tablets 16a is about to be delivered therethrough. Receptacles 17 which are moved across the shelf 90 are guided thereon by a pair of transversely extending rails 95 and 96, the rails being supported by bar extensions 97 thereof, the latter being received in posts 98 fixed to the shelf 90. Set screws 99 are provided in the posts 98 to secure the rods 97 in any adjusted position thereof.

Thus by adjusting the rails 95 and 96 to the proper spacing as between themselves, and adjusting the pair forwardly or rearwardly, they can be arranged to provide a path of movement such as to place a receptacle 17 exactly under the mouth of the fixed delivery chute 32.

In order to cause a receptacle being slid along the shelf 90 between the rails 95—96 to stop at exactly the correct transverse position, a yieldable stop, the details of which are illustrated in Figure 7, is adjustably secured to the forward rail 95. Such stop comprises a movable and lockable body 100 having a set screw 101 by which it may be clamped to the bar 95 at any desired position therealong, said body having formed therein a bore 102 with a slidable detent button 103, positioned in the bore, projecting from the rearward side of the body 100, and being urged in a rearward direction by a compression spring 105. The spring 105 is held in place, and its compressive force adjusted by means of a set screw 106 threaded into the forward end of the bore 102.

Thus, the operator of the machine 15 may move the receptacles, such as glass jars or bottles, transversely along the shelf 90 until such movement is resisted by contact of the receptacle with the button 103. After the load of material 16 has been deposited into the receptacle 17, the latter may be moved on across the shelf 90, such movement forcing the button 103 back into the bore 102 against the urging of the spring 105. The compression of the spring 105 is so adjusted that the operator can just conveniently feel the resistance of the button 103, but is not so strong as to prevent easy movement of the receptacle 17 past the button.

The machine 15 is designed to be interposed, if desired, in a belt conveyor system by which empty receptacles 17 are supplied from the left and filled receptacles carried away to the right. In addition to vertical adjustment of the shelf 90 to the height of the receptacle 17 and forward and rearward adjustment of the rails 95—96 to suit the width of the receptacle, it is necessary to provide different discharge openings of the chute 32 to suit the size of the filling neck of the particular receptacle then in use. Means for this purpose are illustrated in Figure 8. Here it will be seen that an adapter 33 having a vertical funnel-shaped bore 111 therethrough is received in a pair of parallel ways 112 whereby to align the same to form an extension of the chute 32. Several of the adapter units 33 are provided with each of the machines 15, the internal diameters of the bore 111 being of adjusted sizes to suit the filling opening of various sizes of bottles or jars. A thumb screw 113 serves to lock the adapter 110 in an appropriate position of alignment with the filling opening of the receptacle 17.

In operating the counting and packing machine 15, a bulk supply of the material to be packed is placed in the hopper 18, and the disc 21 rotated a number of times experimentally, while changing the tilt of the table 23 by rotation of the hand wheel 82 until substantially none of the bulk material is dragged up the slanting surface of the disc 21 into contact with the upper end of the hopper wall 20. The appropriate adjustment of the vibrator assembly illustrated in Figure 4 is then made by rotation of the hand wheel 46 until each pattern of apertures 22 is completely filled with tablets each time the disc 21 completes a revolution. These adjustments having been made, the speed of the drive assembly may be adjusted through operation of the hand wheel 64 to that which coordinates with the rapidity with which an operator can move receptacles across the shelf 90, and the machine 15 will then operate continuously without further attention, the operator merely moving the receptacles across the shelf 90 in synchronism with the operation of the disc 21. Once the machine has been adjusted to operate on a particular type of material, the hopper 18 can, of course, be refilled as often as desired without readjusting the machine. Only when a change is made from one type of tablet to another is readjustment of the machine necessary in usual practice.

Due to the fact that the straight hopper wall 20 passes to the right of the center of the rotating disc 21, such tablets in excess of the number required to fill one pattern of apertures 22 as strike the straight wall 20 adjacent the upper end thereof may roll downwardly between the center of the disc 21 and the wall 20, thus returning to the bulk supply 16. This arrangement effectively prevents the piling up of excess tablets at the upper end of the wall 20, and eliminates the brushes and/or felt wiper usually employed for this purpose.

While the form of the device described and shown herein is fully capable of achieving the objects and providing the advantages hereinbefore stated, it will be realized that it is capable of some modification without departure from the spirit of the invention. For this reason, we do not mean to be limited to the form shown and described, but rather to the scope of the appended claims.

We claim:

1. In a counting and packing machine of the class described: a table having a discharge opening therethrough; a member movably supported in a superjacent plane parallel to that of said table, said movable member having a plurality of apertures therethrough, each of a size to receive one of a number of objects to be separated into groups of a predetermined number, said apertures being arranged in a pattern disposed to pass over said opening when said movable member is moved; hopper means to support a bulk supply of said objects above said movable member and laterally spaced from said opening whereby movement of said movable member carries an object in each of said apertures from said bulk supply into said opening; drive means including a rotationally yieldable coupling to effect movement of said movable member to carry said pattern successively under said bulk supply and over said opening; and agitating means including a stationary, yieldable detent element and a plurality of complementary movable detent elements carried by said movable member and arranged to successively engage said stationary element whereby to rotationally vibrate said movable member as the same is moved.

2. In a counting and packing machine of the class described: a table having a discharge opening therethrough; a member movably supported in a superjacent plane parallel to that of said table, said movable member having a plurality of apertures therethrough, each of a size to receive one of a number of objects to be separated into groups of a predetermined number, said apertures being arranged in a pattern disposed to pass over said opening when said movable member is moved; hopper means to support a bulk supply of said objects above said movable member and laterally spaced from said opening whereby movement of said movable member carries an object in each of said apertures from said bulk supply into said opening; drive means including a rotationally yieldable coupling to effect movement of said movable member to carry said pattern successively under said bulk supply and over said opening; agitating means including a stationary detent element and a plurality of complementary movable detent elements carried by said movable member and arranged to successively engage said stationary element whereby to vibrate said movable member as the same is moved; a spring positioned to urge said detent element into yielding engagement; and movable anchor means engaged with said spring and adjustable to vary the force of engagement exerted by said spring.

3. In a counting and packing machine of the class described: a fixed base structure; a table top tiltably supported on said base structure and having a discharge opening therethrough; a member movably supported in a superjacent plane parallel to that of said table top, said movable member having a plurality of apertures therethrough, each of a size to receive one of a number of objects to be separated into groups of a predetermined number, said apertures being arranged in a pattern disposed to pass over said opening when said movable member is moved; hopper means carried by said table top to support a bulk supply of said objects above said movable member and laterally spaced from said opening whereby movement of said movable member carries an object in each of said apertures from said bulk supply into said opening; and fluctuating drive means including a yieldable coupling and a plurality of rotation resisting detents operatively associated with said movable member carried by said table top and movable member including a first detent element carried by one of said last named parts, a plurality of complementary detents carried by the other of said parts and arranged thereon to successively engage said first detent element as said movable member is moved and a yieldable coupling connected to said movable member to effect vibratory progressive movement of said movable member to carry said pattern successively under said bulk supply and over said opening.

4. In combination in a counting and packing machine of the type having an inclined rotating disc with a pattern of perforations therein to carry groups of objects to be packed from a bulk supply to a discharge opening positioned under a portion of said disc, a hopper for said bulk supply comprising: an enclosure having a partial cylindrical wall portion extending around a part of the periphery of said disc and upstanding therefrom, and a second upstanding wall portion joining the ends of said first portion, extending chordally across said disc, and positioned to include the center thereof within said enclosure, said wall portions having lower edges closely adjacent the top surface of said disc, said discharge opening lying out from under said enclosure and said second wall portion being spaced from said center and the upper surface of said disc being substantially unobstructed between its center and said second wall portion to permit passage of said objects resting on said disc between said center and second wall portion; and means to support said enclosure above said disc with the lower edges of said wall portions in sliding contact therewith.

5. The construction of claim 4 further characterized in that said second wall portion is positioned substantially parallel to the direction of inclination of said disc.

6. In a counting and packing machine of the class described: a table having a discharge opening therethrough; a member movably supported in a superjacent plane parallel to that of said table, said movable member having a plurality of apertures therethrough, each of a size to receive one of a number of objects to be separated into groups of a predetermined number, said apertures being arranged in a pattern disposed to pass over said opening when said movable member is moved; means to supply said objects to the upper surface of said movable member in a defined area laterally spaced from said opening whereby movement of said movable member carries an object in each of said apertures from said area into said opening; drive means including a yieldable coupling connected to said movable member to drive said movable member to carry said pattern successively past said area and over said opening; and agitating means including a stationary detent element and a plurality of complementary detent elements carried by said movable member and arranged to successively engage said stationary element whereby to effect fluctuation in the driven movement of said movable member.

7. In a counting and packing machine of the class described: a table having a discharge opening therethrough; a member movably supported in a superjacent plane parallel to that of said table, said movable member having a plurality of apertures therethrough, each of a size to receive one of a number of objects to be separated into groups of a predetermined number, said apertures being arranged in a pattern disposed to pass over said opening when said movable member is moved; hopper means to support a bulk supply of said objects above said movable member and laterally spaced from said opening whereby movement of said movable member carries an object in each of said apertures from said bulk supply into said opening; drive means including a rotationally yieldable coupling to effect movement of said movable member to carry said pattern successively under said bulk supply and over said opening; and agitating means carried by said table and movable member including a first detent element carried by one of said last named parts and a plurality of complemental detent elements carried by the other of said parts and arranged to successively engage said first detent element as said movable member is moved whereby to effect fluctuation movement of the latter.

8. In a machine for separating a number of objects into groups and packing said groups: a table with a tiltable top having a discharge opening therethrough; a power drive unit supported under said table and having a drive spindle projecting upwardly through said table; a disc removably secured to said spindle for powered rotation thereon, said disc having a plurality of apertures therethrough arranged in a pattern disposed to move in a path over said opening as said disc is rotated and said disc being sufficiently close to said table to prevent passage of objects through said apertures except when the latter are over said opening; hold-down means for said disc including a member secured to said table and overhanging said disc in frictional engagement therewith adjacent the periphery thereof whereby to constrain said disc to rotation in a plane parallel to said top; a hopper carried by said top overlying a portion of the area of said disc and having an open lower end adjoining said disc to support a bulk supply of said objects in contact with said disc in said path and laterally spaced from said opening; and agitating means including a circumferentially arranged ring of sockets formed in the underside of said disc, and a complemental detent member fixed in said table top and projecting thereabove to successively engage said sockets as said disc is rotated whereby to effect fluctuation in the powered rotation of said disc.

9. The construction of claim 8 further characterized by having two of said complemental detent members positioned at spaced points in said table to contact sockets at spaced points in said ring.

References Cited in the file of this patent

UNITED STATES PATENTS

| | | |
|---|---|---|
| 911,556 | Froggatt | Feb. 2, 1909 |
| 937,152 | Kallenbach | Oct. 19, 1909 |
| 1,173,308 | Rockwell | Feb. 29, 1916 |
| 1,435,743 | Salfisberg | Nov. 14, 1922 |
| 1,495,178 | Hodgdon | May 27, 1924 |
| 1,961,191 | Bliss | June 5, 1934 |
| 2,210,086 | Leake | Aug. 6, 1940 |
| 2,332,026 | Suppiger | Oct. 19, 1943 |
| 2,475,865 | Vore et al. | July 12, 1949 |
| 2,507,883 | Blackman | May 16, 1950 |